Dec. 27, 1949        J. TULLER ET AL        2,492,449
AIR PRESSURE SIGNALING DEVICE
FOR MOLDING APPARATUS
Filed Feb. 1, 1947
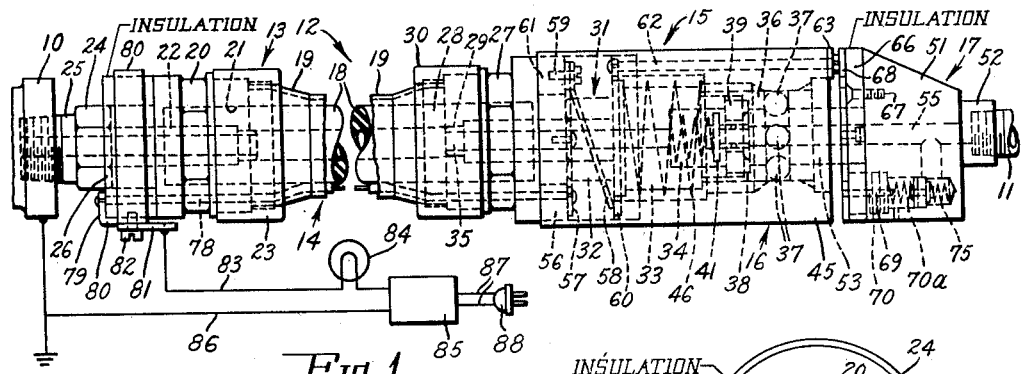
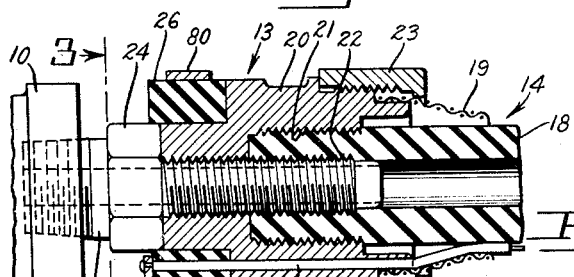
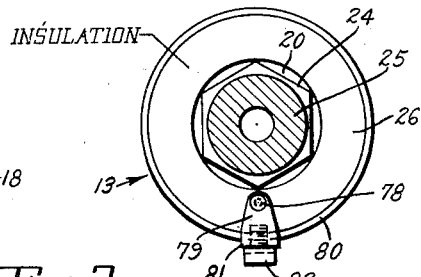
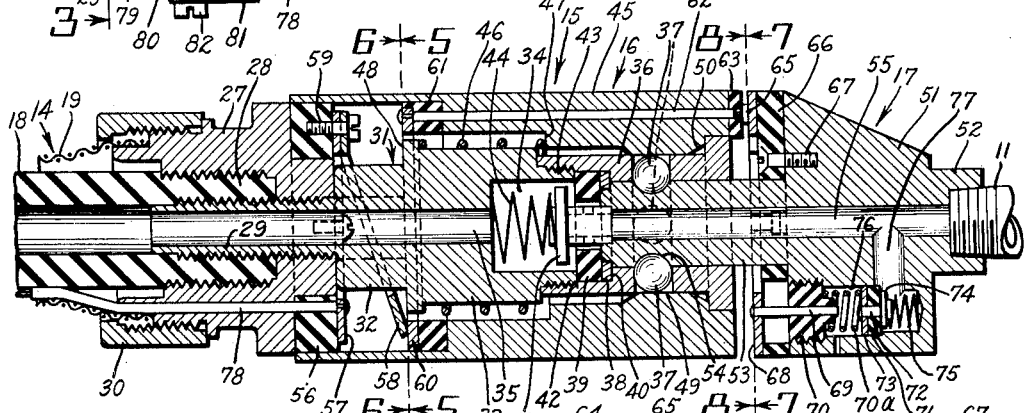
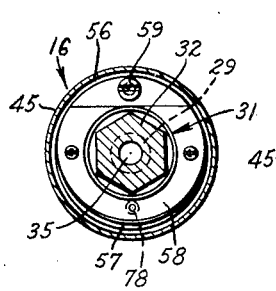
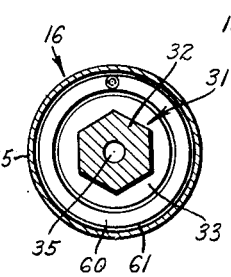
INVENTOR.
JOHN TULLER
ALBERT TULLER
BY
John J. Hanrahan
ATTORNEY Patented Dec. 27, 1949

2,492,449

UNITED STATES PATENT OFFICE 2,492,449

AIR PRESSURE SIGNALING DEVICE FOR MOLDING APPARATUS

John Tuller, Stratford, and Albert Tuller, Bridgeport, Conn.

Application February 1, 1947, Serial No. 725,846

12 Claims. (Cl. 177—311)

1

This invention relates to new and useful improvements in molding apparatus and has particular relation to a signal means for use with vulcanizing molds such as are employed in recapping automobile tires and the like.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a side elevational view showing a connection between a source of compressed air and a mold, the signal means of the invention being incorporated therein;

Fig. 2 is a central longitudinal sectional view through one end portion of said means, the view being on a slightly enlarged scale;

Fig. 3 is a transverse sectional view taken as along the plane of the line 3—3 of Fig. 2;

Fig. 4 is a view similar to Fig. 2 but showing the other end portion of said means;

Fig. 5 is a transverse sectional view taken as along the plane of the line 5—5 of Fig. 4;

Fig. 6 is a transverse sectional view taken as along the plane of the line 6—6 of Fig. 4;

Fig. 7 is a transverse sectional view taken as along the plane of the line 7—7 of Fig. 4; and Fig. 8 is a transverse sectional view taken as along the plane of the line 8—8 of Fig. 4.

Referring in detail to the drawing, at 10 is indicated a portion of a tank or container for compressed air or a part of a pipe connection to such tank or container. For the purpose of this description, 10 will be hereinafter referred to as a connection and it will be understood that such connection may be at a container or may represent the end of a pipe remote from but connected with the container.

At 11 is shown a threaded stem or nipple connected with an inflatable device (not shown) as, for example, the inflatable bag or core of a mold structure. The mold structure referred to is, generally speaking, of the type used in the applying of treads to tires and the like. However, it will be understood that the present invention applies generally to a means for connecting a source of compressed air or of air under pressure with an inflatable device.

The connecting means of the invention is generally designated 12 and the same includes an attachment 13 at one end of a hose 14 and at the other end of which hose there is a part 15 of a detachable connection 16, such connection also including a part 17 detachable from the part 15 and connected with the nipple 11.

As herein disclosed, the hose 14 comprises an inner tubular rubber portion 18 about which there is located a metal sheathing 19. As shown, this sheathing comprises a woven metal structure whereby it will protect the inner rubber portion of the hose and in accordance with the present invention, such woven metal structure forms a portion of an electrical circuit, as will later fully appear.

The attachment 13 includes a body portion 20 which is substantially hollow and has a passage entirely therethrough. Within an enlarged portion of this passage, one end portion 21 of the rubber 18 is received and is wedgedly held between the inner walls of the body and a portion of a threaded stem 22. At the attachment, the sheathing 19 is expanded and disposed on an end portion of the attachment and is gripped between said end portion and a sleeve 23 threaded to the body 20.

In this way, one end of the hose 14 is securely anchored to the attachment 13 and in addition, the sheathing 19 at said end portion of the hose is in electrical engagement with a metal body 20. The stem 22 above referred to comprises a part of a nipple-like device including a flatted portion 24 to be engaged by a wrench and a threaded portion 25 beyond said portion 24 and threaded into the connection 10. About the end portion of the body 20, remote from the threaded sleeve 23, is a ring 26 of insulating material, the purpose of which will later fully be set forth.

The separable two-part coupling device 16 has its part 15 secured to the other end portion of the hose 14. This coupling part comprises a body 27 having a passage entirely therethrough and into an enlarged portion of which passage an end portion 28 of the rubber hose 18 is received. Such portion of the hose is more or less squeezed or wedged between the inner surface of the body and the outer surface of a stem 29 which is threaded into the body.

As shown in Fig. 2 and Fig. 4, the respective end portions 21 and 28 of the rubber hose 18 are secured in the bodies 20 and 27 by compression of the received portions of the hose. Further, it is noted that the bodies 20 and 27 are internally threaded and that the stems 22 and 29 are externally threaded so that there is a biting into the material of the hose 18.

The end portion of the sheathing 19 adjacent the body 27 is anchored to such body in such manner as to mechanically secure these parts together and to provide electrical contact between them. Thus, the end portion of the sheathing is expanded and disposed about an end portion of body 27 and is clamped to such portion by means of a ring 30 threaded to the body.

Stem 29 comprises a portion of a device generally designated 31 and in addition to said stem including an intermediate portion 32 having flat sides for engagement by a wrench or the like and an opposite head-like end portion 33 having therein a chamber 34. As shown, there is a passage 35 entirely through the device 31 including the stem or nipple portion 29 thereof.

Threaded to the head-like portion 33 of the device 31 is a clutch or fastening device part in the form of a cage 36 which is generally cylindrical and is provided in its walls with a series of openings each receiving an incompressible metal ball 37. Within one end, the cage 36 is provided with a washer 38 on which is disposed a relatively thick gasket 39, the washer and gasket being held in place between the free end of the head 33 of device 31 and an internal shoulder 40 of the cage 36.

A valve comprising a head 41 and a hollow stem 42 is located partly within the chamber 34 and partly within the washer 38 and gasket 39. As shown, the valve has lateral or radial openings 43 through its stem portion and the latter is hollow. When the coupling parts 15 and 17 are separated, a coil spring 44 functions to maintain the valve with its head 41 seated against the gasket 39 to prevent the movement of compressed air from the hose 14 out through the coupling part 15.

Surrounding the cage 36 and a good portion of the device 31 is a sleeve 45. This sleeve is normally held in the position in which it is shown by means of a coil spring 46 abutting an internal shoulder 47 of the sleeve and the inner side of a radial flange-like portion 48 of the device 31. When the sleeve is so positioned, its internally thickened portion 49 is located at the outer sides of the balls 37 and maintains them in the inner positions in which they are shown.

However, this sleeve 45 may be slid forwardly, or to the left as the device is viewed in Fig. 4, by compression of the spring 46. When this is done, as internal radial enlargement 50 of the sleeve is brought over the balls 37 and the same may move radially outwardly permitting of separation of the coupling parts 15 and 17 as will later be more fully described.

The coupling part 17, as shown, includes a body 51 having a threaded recess 52 receiving a portion of the stem or nipple 11 of the inflatable device (not shown). Projecting from the other end of the body 51 is a stem-like portion 53 of an external diameter to be received in the cage 36. This stem-like portion 53 has an annular groove 54 so located as to have the balls 37 enter partially thereinto when the parts 17 and 15 are coupled. Thus, it will be seen that on insertion of the stem 53 into the cage 36, the parts 15 and 17 are secured together.

To accomplish this, the sleeve 45 is shifted forwardly as above described to bring the enlargement 50 opposite the balls whereupon on insertion of the stem into the cage, the forward end of the stem will cam the balls outwardly and then the balls will drop partially into the groove 54. Thereupon, on release of the sleeve, the spring 46 returns it to normal position so that the balls are then held in their inner positions by the internally enlarged portion 49 of the sleeve. It is here noted that as the stem 53 of the coupling part 17 is inserted into the cage in the manner described, the forward or inner end of such stem engages the stem 42 of the valve and shifts the same to the position of Fig. 4 whereupon the passage 35 above described is in communication through the chamber 34 and the lateral ports 43 of the valve stem with a passage 55 through the coupling 17.

The coupling parts 15 and 17, in addition to the structure above described, includes certain means for the completion of an electrical circuit through these parts. To such end, a ring 56 of insulating material is arranged on the body 27 and against the forward face of such ring there is secured an annulus 57 of brass or other conducting metal. To such annulus, a second annulus 58 is secured and it is noted that these two parts are secured together and to the ring 56 as by an anchoring screw 59 and that the annulus 58 is bent adjacent the said anchoring screw and extends diagonally forwardly.

The diagonal portion of the annulus 58 is constantly in engagement with a conducting ring 60 mounted on a ring 61 of insulating material carried by the sleeve 45. A conductor 62 passes through said sleeve and is insulated therefrom and further, this conductor passes through an insulating piece 63 fastened to the outer or free end of the sleeve 45 by rivets or the like 64. On the front end of the insulating piece 63, a contact element 65 is located and the same is electrically connected with the conductor 62. From what has been said, it will be apparent that the annuli 57 and 58, the ring 60, the conductor 62, and the contact 65 provide a path for electrical current through but insulated from the metal parts of the coupling part 15.

On the inner face of the body 51 of the coupling part 17 there is mounted a ring or annulus 66 of insulating material, the same being secured in place as by screws 67. On the outer face of such ring there is located an annulus or ring 68 of conducting material, as for example, brass. Carried by the conducting ring 68 is a conducting prong 69 passing through an insulator 70 threaded or otherwise mounted in the outer end portion of a cylinder construction 70a.

Also mounted in said cylinder construction is an insulating disc 71 having a conducting pin 72 passing therethrough and anchored at its upper and lower ends as by metal discs 73 and 74. The pin 72 is aligned with the inner end of the prong 69 and is constantly edged toward such prong as by a spring 75 but is restrained from such movement by a stronger spring 76. The spring 75 seats against the metal disc 74 and against the bottom wall of the cylinder 70a and thus is in electrical engagement with a part of the body 51.

A branch 77 connects the passage 55 with the bottom or inner end of cylinder 70a. With this construction, when air under a predetermined pressure is admitted to or built up in the passage 55 and branch 77, the disc structure carrying the pin 72 is moved outwardly against the action of the spring 76 until such pin engages the prong 69, making electrical contact therewith. The result of this action will later appear.

Extending through the body 20 of the attachment 13 is a conductor 78 which is insulated from the attachment and passes along between the hose 18 and the sheathing 19 and is insulated from the latter. Further, this conductor passes through the body 27 of the coupling part 15 and through the insulating ring 56 and is electrically connected with the annulus 57.

At the attachment end, the conductor 78 is electrically connected with an ear-like extension 79 carried by a metal conducting ring 80. An attaching lug 81 is fastened to the ring as by a screw 82. Electrically connected with the lug 81 is a lead 83 of a circuit including an electric bulb or other signalling device 84, a transformer 85 and a lead 86. As shown, the transformer 85 is connected with a suitable source of current through wires 87 and an attachment plug 88. Preferably, the transformer 85 is a six-volt transformer.

With the construction described, it will be clear that when the attachment 13 is secured to the connection 10 and the coupling part 17 is secured to the stem or nipple 11, the whole present connecting means is open for the passage of air under pressure from the connection through the attachment 13 and hose 14 to the coupling part 15 and hence through the valve stem 42 to the passage 55 and the nipple or stem 11. At this time, there is a circuit from the transformer through the bulb or other signalling device 84 and the ring 80 and ear 79 to the conductor 78. Thence the circuit is through the annuli 57 and 58 to the ring 60 and the conductor 62 to the contact 65 and thence to the conducting ring 68 and prong 69.

Now, if there is a predetermined pressure in the branch 77 of the air passage, the pin 72 will be in engagement with the prong 69 whereby the latter will be electrically connected with the body 51. Body 51 includes the stem portion 53 which is in engagement with the cage 36 and thus with the device 31 to the body 27. The body 27, through the metal sheathing 19, is electrically connected with the body of the attachment 13 and the latter through the stem 22 intermediate part 24 and stem or nipple 25 is electrically connected with the connection 10 and through the wire 86 back through the transformer 85 to the plug 88. Thus, it will be seen that with the construction shown and described, whenever the air pressure being applied to the inflatable device is at or above a predetermined point, the pin 72 will be in engagement with the prong 69 and a circuit will be closed through the signalling device 84.

On failure of the air pressure for any reason, the signal 84 will not be energized. Thus, when the present connecting means is employed, for example, in a shop where tires are retreaded, the attendant will be notified, by extinguishment of the bulb 84, should there be a failure of air under pressure to the inflatable bag or core being used in the retreading mold. In this connection, it will be understood that frequently a great deal of labor and material is lost due to the failure of the air pressure during the process of vulcanizing treads or retreads onto tires.

If the air pressure is not maintained at the proper point during the vulcanization period, a poor job is obtained resulting in waste of the tread stock and the necessity for repeating the vulcanization operation with new tread stock. With the connecting means of the present invention, this may be avoided as a distinct signal will be given at any time there is a failure of air pressure. Further, the signal circuit is connected up by the simple operation of coupling together the separable coupling parts 15 and 17 and this further automatically establishes the line for the air under pressure since it results in unseating of the valve 41.

When the parts 15 and 17 are uncoupled, in the manner above described, by first shifting the sleeve 45 forwardly, the air line is automatically closed by the valve 41 and the electric circuit is disrupted since part of such circuit is through the coupling part 17. Due to the connection between the annuli 57 and 58 and 60, it will be seen that there is nothing to interfer with forward movement of the sleeve 45 when the parts 15 and 17 are to be coupled or uncoupled.

This merely results in flexing of the forwardly bent portion of the annulus 58 but the same is of spring stock and follows the sleeve when it returns to normal and at all times serves to maintain the contact or circuit between the annuli 57 and 60. Additionally, this circuit is maintained regardless of any turning of the sleeve 45 about its longitudinal axis. Likewise, due to the use of the annulus 68, no care is required in coupling of the parts 15 and 17 since the contact 65 will always engage some part of said annulus.

It is also to be understood that the present means may be used for purposes other than in connection with tire capping molds. For example, the means of the invention may be used in the air brake systems of trucks and the like, where air under pressure is to be supplied to a cylinder and piston construction. Further, while the apparatus has been described as employed in connection with compressed air, it may be used where other fluids under pressure are being conveyed.

Having thus set forth the nature of our invention, what we claim is:

1. In a molding apparatus, a first metal coupling part for attachment to the inflatable bag or core of a mold, a hose including a core of electrical insulating material and a metal sheathing about said core, a metal attachment on one end of said hose for connection with a source of compressed air, a second metal coupling part on the other end of said hose and complimental to the first coupling part for cooperation therewith to connect the source of compressed air with said inflatable bag or core, said sheathing in engagement with said attachment and said second coupling part, an electrical conductor passing through said attachment and along said hose and through the second coupling part and insulated from all of them, a contact element on the free end of the second coupling part and electrically connected with said conductor, a contact on the first coupling part and insulated therefrom and adapted to be engaged by said contact element when said coupling parts are coupled for the passage of compressed air to said bag or core, means in the first coupling part and shiftable by compressed air when the latter is supplied thereto to electrically connect said contact to said part, said coupling parts including metal portions engaging when said parts are coupled whereby the shifting of said means closes a circuit from said conductor through said coupling parts and said sheathing to said attachment and the container for the source of compressed air, and a circuit connected with said conductor and grounded on the container for the compressed air and including a transformer and a means to be energized when said circuit is closed as said means in the first coupling part is shifted.

2. In a means for connecting a source of compressed air and an inflatable device, said means comprising a flexible hose, an attachment on one end of said hose for connection with a source of compressed air, a detachable coupling including a pair of parts of which the first part is secured to the other end of said hose and the second part is adapted to be secured to an inflatable device, a shiftable contact in one of said parts, spring means for maintaining said contact in a normal position and operable to return it to said position when moved therefrom and released, means for shifting said contact from normal position when air under a predetermined pressure is supplied to said coupling part, and a circuit controlled by said contact.

3. The apparatus as in claim 1 wherein one of said contact elements and said contact is in the form of an annulus for electrical engagement of said contact element and said contact in any coupled position of said first and second coupling parts.

4. The means as in claim 2 wherein said circuit includes independent conducting paths from said attachment to said coupling and return.

5. The means as in claim 2 including a conductor from said attachment to said coupling and insulated from both of them, a metal sheathing about said hose and electrically connecting the coupling and the attachment, and a make and break means between said coupling parts and automatically connected on coupling of said parts.

6. The means as in claim 2 wherein said shiftable contact comprises a piston-like means and wherein said coupling part includes a cylinder construction in which said contact is located and is shiftable.

7. The apparatus as in claim 1 wherein the second coupling part includes a sleeve shiftable longitudinally to release the first and second coupling parts for separation, said conductor including a portion passing through said sleeve, a contact connected with said conductor portion and carried by but insulated from said sleeve, a spring contact engaging said contact and comprising part of said conductor, and said spring contact mounted to collapse and expand and maintain said conductor continuous as said sleeve is moved to bring about release of the coupling parts for separation and as said sleeve is moved in the opposite direction.

8. In a means for connecting a source of fluid under pressure and a device, said means comprising a flexible hose, an attachment on one end of said hose for connection with a source of fluid under pressure, a detachable coupling including a pair of parts of which the first part is secured to the other end of said hose and the second part is adapted to be secured to a device, a shiftable contact in one of said parts, spring means for maintaining said contact in normal position and operable to return it to said position when moved therefrom and released, means for shifting said contact from normal position when fluid under a predetermined pressure is supplied to said coupling part, and a circuit controlled by said contact.

9. In a means for making a connection for the passage of fluid under pressure from a source to a device and to simultaneously provide for the establishment of an electric circuit on the flow of fluid under pressure from a source through said means to a device, said means comprising a flexible hose, an attachment at one end of said hose for connection with a source of fluid under pressure, a detachable coupling comprising a pair of parts of which the first part is secured to the other end of said hose and the second part is adapted to be secured to a device, complemental portions on said parts for coupling them together on relative movement thereof for the passage of fluid under pressure from the first to the second part, manually releasable means for securing said parts in coupled together relation whereby they may be easily and quickly uncoupled, an electrical contact on each of said coupling parts, a conductor mechanically connected to and electrically insulated from said attachment and extending along said hose and electrically connected with the contact on the first coupling part at all times, means insulating the contact on the second coupling part therefrom, said contacts on the coupling parts located to engage one another on coupling of said parts together for the passage of fluid under pressure through the first part to the second part, and means whereby the contact of the second part is electrically connected with said second part on movement of fluid under predetermined pressure from the first to the second coupling part.

10. In a means for making a connection for the passage of fluid under pressure from a source to a device and to simultaneously provide for the establishment of an electric circuit on the flow of fluid under pressure from a source through said means to a device, said means comprising a flexible hose, an attachment at one end of said hose for connection with a source of fluid under pressure, a detachable coupling comprising a pair of parts of which the first part is secured to the other end of said hose and the second part is adapted to be secured to a device, complemental portions on said parts for coupling them together on relative movement thereof for the passage of fluid under pressure from the first to the second part, manually releasable means for securing said parts in coupled together relation whereby they may be easily and quickly uncoupled, an electrical contact on each of said coupling parts, a conductor mechanically connected to and electrically insulated from said attachment and extending along said hose and electrically connected with the contact on the first coupling part at all times, means insulating the contact on the second coupling part therefrom, means whereby said electrical contacts on the coupling parts are electrically connected together on coupling of said parts together for the passage of fluid under pressure through the first part to the second part, and means whereby the contact of the second part is electrically connected with said second part on movement of fluid under predetermined pressure from the first to the second coupling part.

11. A connecting means of the character described comprising a first coupling part adapted to be connected to a device for the passage to said device of fluid under pressure, a second coupling part adapted to be coupled with said first part for the passage of fluid under pressure through said second to said first part, means for connecting said second part to an end of a flexible hose, said second part having a passage therethrough for the movement of fluid under pressure from a hose through said second part to said first part when said parts are coupled together, said first part having a passage therethrough to receive fluid under pressure from the second part and deliver it to a device to which the first part may be connected, an electrical contact on each of said coupling parts, means insulating the contact on the first coupling part therefrom, means whereby the contacts on the coupling parts are electrically connected together on the coupling of said parts together for the passage of fluid under pressure through the second part to the first part, and means whereby the contact on the first part is electrically connected with said first part on movement of fluid under predetermined pressure from the second into the first coupling part.

12. A connecting means of the character described comprising a first coupling part adapted to be connected to a device for the passage to said device of fluid under pressure, a second coupling part adapted to be coupled with said first part for the passage of fluid under pressure through said second to said first part, means for connecting said second part to an end of a flexible hose, said second part having a passage therethrough for the movement of fluid under pressure from a hose through said second part to said first part when said parts are coupled together, said first part having a passage therethrough to receive fluid under pressure from the second part and deliver it to a device to which the first part may be connected, an electrical contact on each of said coupling parts, means insulating the contact on the first coupling part therefrom, means whereby the contacts on the coupling parts are electrically connected together on the coupling of said parts together for the passage of fluid under pressure through the second part to the first part, means providing a cylinder in said first part and a branch from said passage to one end of said cylinder, an extension from the contact on the first part and entering said cylinder, a piston in said cylinder and normally spaced from said extension, means on said piston to close an electric connection between said extension and said first part on contact with said extension, and said piston movable in said cylinder to engage said means with said extension on movement of fluid under predetermined pressure through said branch to said cylinder.

JOHN TULLER.
ALBERT TULLER.

REFERENCES CITED

The following references are of record in the file of this patent:

UNITED STATES PATENTS

| Number | Name | Date |
|---|---|---|
| 423,385 | Miesse | Mar. 11, 1890 |
| 499,254 | Sargent | June 13, 1893 |
| 872,039 | Adams | Nov. 26, 1907 |
| 952,070 | Cota | Mar. 15, 1910 |
| 1,024,061 | Clark | Apr. 23, 1912 |
| 1,035,572 | Gasch | Aug. 13, 1912 |
| 1,224,952 | Naginey | May 8, 1917 |
| 1,507,648 | Wilson | Sept. 9, 1924 |
| 1,656,689 | Benn et al. | Jan. 17, 1928 |
| 2,255,333 | Scheiwer | Sept. 9, 1941 |
| 2,321,631 | Sibal | June 15, 1943 |
| 2,323,575 | Snowberger | July 6, 1943 |